(12) United States Patent
Hatch et al.

(10) Patent No.: US 7,935,260 B2
(45) Date of Patent: May 3, 2011

(54) FILTERING SYSTEMS AND METHODS CHARACTERIZED BY REDUCED COLOR THROW

(75) Inventors: Gary L. Hatch, Sheboygan, WI (US); Rajendra K. Mody, Bloomingdale, IL (US); Michael Gottlieb, Cherry Hill, NJ (US); Carl Galletti, La Grange, IL (US)

(73) Assignee: Pentair Filtration Solutions, LLC, Hanover Park, IL (US)

( * ) Notice: Subject to any disclaimer, the term of this patent is extended or adjusted under 35 U.S.C. 154(b) by 720 days.

(21) Appl. No.: 11/843,006

(22) Filed: Aug. 22, 2007

(65) Prior Publication Data

US 2008/0073276 A1    Mar. 27, 2008

Related U.S. Application Data

(60) Provisional application No. 60/839,638, filed on Aug. 23, 2006.

(51) Int. Cl.
*C02F 1/42* (2006.01)

(52) U.S. Cl. .......................... 210/686; 210/282; 210/263

(58) Field of Classification Search .................. 210/686, 210/282, 263
See application file for complete search history.

(56) References Cited

U.S. PATENT DOCUMENTS

| | | | |
|---|---|---|---|
| 3,462,363 A | 8/1969 | Mills | |
| 3,717,594 A | 2/1973 | Ryan | |
| 4,775,541 A | 10/1988 | Brown et al. | |
| 4,839,331 A | 6/1989 | Maroldo et al. | |
| 4,957,897 A | 9/1990 | Maroldo et al. | |
| 5,094,754 A | 3/1992 | Maroldo et al. | |
| 5,104,530 A | 4/1992 | Maroldo et al. | |
| 5,428,074 A | 6/1995 | Cutler | |
| 5,616,622 A | 4/1997 | Harris et al. | |
| 5,954,965 A | 9/1999 | Kubota et al. | |
| 6,060,526 A | 5/2000 | Tasaki | |
| 6,280,717 B1 | 8/2001 | Kamakura et al. | |
| 6,624,206 B2 | 9/2003 | Bachmann et al. | |
| 6,693,139 B2 | 2/2004 | Bachman et al. | |
| 6,784,213 B2 * | 8/2004 | Rohrbach et al. | ................ 521/33 |
| 6,829,319 B2 | 12/2004 | Ito et al. | |
| 6,867,275 B2 | 3/2005 | Alexander, IV et al. | |
| 7,521,484 B2 * | 4/2009 | Parker, Jr. | ....................... 521/28 |
| 2004/0132840 A1 | 7/2004 | Bohling et al. | |

FOREIGN PATENT DOCUMENTS

JP    57012881 A  *  1/1982

OTHER PUBLICATIONS

Japanese Patent Abstract Publication No. JP57012881A2; Water Disposal; Published Jan. 22, 1982.
Japanese Patent Abstract Publication No. JP61064390A2; Treatment of Water; Published Apr. 2, 1986.

* cited by examiner

*Primary Examiner* — Chester T Barry
(74) *Attorney, Agent, or Firm* — Quarles & Brady LLP (57) ABSTRACT

Disclosed are water treatment systems and methods that are characterized by reduced leaching of color-bearing material (i.e., color-bearing leachates) into effluent water. The disclosed systems and methods may include or utilize filtering systems comprising selected mixed ion-exchange resin beds of a strong acid sulfonated cation exchange resin and an anion exchange resin.

25 Claims, 4 Drawing Sheets

FILTERING SYSTEMS AND METHODS CHARACTERIZED BY REDUCED COLOR THROW

CROSS-REFERENCE TO RELATED APPLICATIONS

This application claims the benefit of priority under 35 U.S.C. §119(e) to U.S. provisional application No. 60/839,638, filed on Aug. 23, 2006, the content of which is incorporated herein by reference in its entirety.

FIELD

The present invention relates to water treatment systems and methods. In particular, the invention relates to water treatment systems and methods designed to reduce leaching of color-bearing material from cation exchange resins which are commonly utilized in water treatment systems and methods.

BACKGROUND

Strong acid cation (SAC) exchange resins commonly are used in water treatment systems and methods. These resins may be present in filters through which treated water has been passed to remove contaminants such as metal cations, which contribute to water "hardness." As such, SAC exchange resins commonly are used in water "softening" applications where water hardness must be treated to prevent significant end-use problems such as scale and soap-scum formation, excess detergent use, corrosion of household fixtures, and reduced life of household appliances. Commercial applications of water softening have these same concerns and many others as well. In the food service and beverage dispensing industry, water must be treated not only to meet the specified optimum degree of water softening, but also to obtain water that is clear and colorless so as to not alter the quality and appearance of the food or beverages produced from the treated water.

One disadvantage of using SAC exchange resins in water treatment systems is that these resins continuously leach material into the treated or "effluent" water. This leached material or "leachate" may impart undesirable properties to the effluent water, such as undesirable color. Significant concentrations of leachate may be released from the SAC exchange resin during periods of non-use, such as non-use during storage or retail display, overnight non-use, or down time non-use during equipment servicing.

In particular, synthetic SAC exchange resins that include divinylbenzene (DVB) cross-linked styrene sulfonic acid continuously leach an intensely colored species of non-polymerized (linear) styrene sulfonate. This leachate is a leftover by-product of the manufacturing polymerization process, but also may be generated from the resin beads themselves during use, due to the breakdown of the resin in oxidative reactions. Depending upon the concentration of the leachate material that has built up within the filter, this leachate material may stain the filtered water anywhere from a slight yellow color to a dark brown color. This causes a significant negative aesthetic effect when a consumer attempts to use the treated water. This negative anesthetic effect is particularly undesirable for end products in the commercial food and beverage preparation industries.

Some systems have attempted to remove negatively charged (anionic) leachate material from an SAC exchange resin by subsequently treating the effluent with a separate bed of anion exchange resin. However, these systems have inherent limitations because they require the use of an additional resin bed, thus increasing the size of the filter. Furthermore, the anion exchange resin bed may have poor kinetic absorptive capability for leachate material and may only remove the leachate after the leachate contacts the anion exchange resin for a sufficient period of time. The dynamic flow rates used in standard SAC exchange resin filter systems typically exceed the slower flow rates required for a separate anion resin bed to absorb cation resin leachates. Therefore, better systems for removing SAC exchange resin leachates are desirable.

SUMMARY

Disclosed are systems and methods that are characterized by reduced "color throw" or discoloration of a liquid, such as water, passing through a bed in an ion-exchange process. The disclosed systems and methods may include water treatment systems and methods that are characterized by reduced leaching of color-bearing material (i.e., color-bearing leachates). The disclosed filtering systems may include mixed ion-exchange resin beds and filtering systems. The disclosed methods may include methods of preparing and utilizing filtering systems.

The disclosed filtering systems and methods are characterized by reduced amounts of leachates, which are typically observed in systems and methods that utilize filters that include an SAC exchange resin. In some embodiments, the SAC exchange resin comprises styrene sulfonic acid which commonly is released as a color-bearing leachate. The filtering systems disclosed herein may continuously absorb styrene sulfonate as it reaches the surface of a SAC resin bead surface. By removing the leachate before it leaches into the aqueous void spaces surrounding the SAC resin beads, the leachate is not allowed to accumulate to a concentration that will cause an adverse aesthetic effect upon the treated water (i.e., as a color-bearing leachate).

In the disclosed filtering systems and methods, a leachate typically observed after prolonged storage of a SAC resin may be reduced by utilizing a mixed resin bed that comprises an anion resin and the SAC resin. The anion resin may be Type 1 or Type 2 anion resin, which may be in chloride or hydroxide form and which may be gel or macroporous. For example, in some embodiments, the anion resin is a Type 1 strong base resin (e.g., a strong base divinylbenzene (DVB)—crosslinked quaternary ammonium chloride form). In other embodiments, the anion resin is a Type 2 macroporous anion resin. In further embodiments, the anion resin removes large molecular weight organics (i.e., organics having a molecular weight greater than about 500 kD), such as tannins.

During periods of non-flow in the disclosed filtering systems and methods, the SAC resin leachate may be immediately absorbed by the anion resin. The disclosed filtering systems and methods may achieve improved leachate removal by positioning the anion resin beads in a mixed bed such that at least one anion resin bead is adjacent to each SAC resin bead. For example, each SAC resin bead may directly contact at least one anion resin bead. Desirable positioning of anion resin beads and SAC resin beads may be achieved by mixing selected ratios of anion resin beads and SAC resin beads prior to placement in a water treatment container (e.g., a cartridge or tank). Desirable positioning of anion resin beads and SAC resin beads also may be achieved by mixing anion resin beads and SAC resin beads having selected sizes (i.e., having average diameters of a selected size or size range), prior to placement in a water treatment container.

In some embodiments, the disclosed filtering systems and methods are not characterized by significantly diminished filtering or softening capacity in comparison to methods and systems utilizing a resin bed having a similar content of SAC resin. For example, the disclosed systems having a mixed bed of anion resin and SAC resin may comprise a preferable mixture of cation and anion resin beads where the filtering or softening capacity for a system is not diminished due to the addition of anion resin beads. The filtering capacity of the disclosed systems typically is at least about 70% of the filtering capacity for a resin bed composed entirely of SAC resin (preferably at least about 75%, 80%, 85%, 90%, or 95% of the filtering capacity for a resin bed composed entirely of SAC resin).

The disclosed filtering systems may comprise mixed resin beds having a selected range of anion resin. A preferable range of percent anion resin blended with cation resin may be from about 5% to about 25% (v/v anion resin volume versus total resin volume in the mixed bed) and more preferably about 10% to about 20%, and even more preferably about 15% to about 20%.

In the disclosed filtering systems and methods, the size of the anion resin beads may be selected such that the anion resin beads have an average diameter that is less than, the same as, or greater than the average diameter of the cation resin beads. In some embodiments, the size of the anion resin beads may be selected to fill the aqueous void space between the cation resin beads. In further embodiments, the anion resin beads may be selected such that they have a size that allows maximum contact with the cation resin beads and do not excessively restrict water flow through the resin bed. In even further embodiments, a size for the anion resin beads may be determined as the void dimension between the cation resin beads and may be based on the close-packing structure of spherical cation resin beads. For example, in some embodiments the anion resin may have an average bead diameter that is no more than about 50% of the average bead diameter for the strong cation resin (or no more than about 40%, 30%, or 20% of the average bead diameter for the strong cation resin). Ratios of the average diameter for the anion resin beads versus the average diameter for the cation resin beads may be about 0.150-0.500 (or about 0.225 to about 0.414).

In some embodiments of the disclosed filtering systems and methods, the anion resin beads and SAC resin beads form a tetrahedral close-packed structure. In some structures, the anion resin beads may have an average diameter of about 0.06 mm to about 0.26 mm and the cation resin beads may have an average diameter of about 0.29 mm to about 1.20 mm (16-50 mesh), where the ratio of the average diameters is about 0.225. In other embodiments of the disclosed filtering systems and methods, the anion resin beads and SAC resin beads may form a hexagonal close-packed structure. In some structures, the anion resin beads may have an average diameter of about 0.12 mm to about 0.48 mm and the cation resin beads may have an average diameter of about 0.29 mm to about 1.20 mm (16-50 mesh), where the ratio of the average diameters is about 0.414.

In still further embodiments of the disclosed filtering systems and methods, a mixed resin bed comprises anion and cation resin having densities (e.g., wet densities) that do not differ significantly. For example, the mixed bed may comprise anion and cation resin having similar densities such that when the resin bed is back-flushed, the fluidization of the bed will not cause the displacement of the cation and anion resin beads from their selected and/or original position in the mixed bed. The anion resin may have a density that is about the same as the density for the cation resin. In further embodiments, the mixed bed may comprises anion and cation resin where the anion resin density does not differ from the cation resin density by more than about 20% (or preferably does not differ by more than about 10%, or more preferably does not differ by more than about 5%). The mixed bed may comprise cation sodium form resins (wet) having bulk densities of about 50-55 lbs per cubic foot and anion chloride form resins (wet) having bulk densities of greater than about 41 lbs per cubic foot (e.g., having a density of about 41-55 lbs per cubic foot or about 41-44 lbs per cubic foot). The mixed bed may comprise anion resins comprising resin beads having a higher density than DVB-crosslinked styrene (i.e., styrene-DVB copolymer beads). For example, the anion resin may comprise beads made from a polymeric structure having a higher molecular weight than styrene and/or a cross-linking agent having a higher molecular weight than divinyl benzene (e.g., a cross-linking agent that is chlorinated or fluorinated) so as to increase the bulk density of the anion resin. In some embodiments, the density of anion beads or cation beads may be varied based on the percentage DVB used to prepare the DVB-crosslinked styrene beads (i.e., using 2%, 4%, 6%, 8%, 10%, 12%, 14%, 16%, 18%, or 20% DVB to prepare DVB-crosslinked styrene beads for the anion resin or cation resin).

In other embodiments of the disclosed filtering systems and methods, loss in volume-based operating capacity may be minimized. For example, the anion and cation resin beads may have a selected size and/or may be positioned in a manner such that the volumes of the component anion resin beads and the cation resin beads are not directly additive. In some embodiments, the sizes of the anion and cation resin beads may be selected to maximize the amount of SAC resin per volume of the mixed resin bed. The minimizing of the loss in volume-based operating capacity (or maximizing of the amount of SAC resin per volume of the mixed resin bed) may be achieved in a mixed bed where the anion resin beads are smaller in size than the cation resin beads and the anion resin beads fill or fit in the void spaces between the cation resin beads. For example, cation resin beads having an average diameter of about 0.7 mm to about 0.9 mm may be mixed with anion beads having an average diameter of about 0.3 mm to about 0.5 mm. The cation resin beads and the anion resin beads also may be mixed at a preferable ratio to minimize the loss in volume-based operating capacity (or to maximize the amount of SAC resin per volume of the mixed resin bed).

DETAILED DESCRIPTION

The present invention is described herein using several definitions, as set forth below and throughout the application.

As used herein, "about", "approximately," "substantially," and "significantly" will be understood by persons of ordinary skill in the art and will vary to some extent on the context in which they are used. If there are uses of the term which are not clear to persons of ordinary skill in the art given the context in which it is used, "about" and "approximately" will mean up to plus or minus 10% of the particular term and "substantially" and "significantly" will mean more than plus or minus 10% of the particular term.

The term "ion exchange resin" is used conventionally herein and refers generally to strong and weak acid cation exchange resins and strong and weak base anion exchange resins of either the gel or macroporous type. Cation exchange resins and anion exchange resins may be referred to herein as "cation resins" and "anion resins," respectively.

Typically, the ion exchange resins employed herein are prepared as spheroidal polymer beads. Of particular interest are the strong acid cation resins derived from monovinylidene aromatic monomers, such as styrene or monoalkyl substituted styrene (e.g., vinyltoluene) and a copolymerizable crosslinking agent. Preferred crosslinking agents include, but are not limited to the di- or polyvinylidene aromatics, such as divinylbenzene and divinyltoluene, and ethylene glycol dimethacrylate. The strong acid cation resins typically are sulfonated copolymers of a monovinylidene aromatic and a copolymerizable crosslinking agent. In some embodiments, the anion resin employed herein is a strong base anion resin. The anion resin employed herein may be in halide form (e.g., chloride form). Suitable anion resins may include: macroporous, Type 1 strong base (divinylbenzene(DVB)-crosslinked) quaternary ammonium—chloride form anion resin; Type 2 macroporous anion resins; and anion resins that are designed specifically for removing large molecular weight organics (i.e., organics having a molecular weight greater than about 500 kD), such as tannins.

As used herein, "color throw" refers to discoloration of a liquid passing through a resin bed in an ion-exchange process. Discoloration may be caused by leaching of material from a strong acid cation resin, particularly after periods of storage or stagnation.

It has been found that mixed resin bed forms may be utilized to reduce leaching of material from a strong acid cation resin present in the mixed bed. In some embodiments, strong acid cation resin in the mixed beds may include sulfonate groups, which are prevented from leaching into effluent water by anion resin present in the mixed bed. The strong acid cation resin may include sulfonated poly(vinylaromatic) groups prepared by the sulfonation of vinylaromatic polymers using conventional sulfonation techniques (e.g., conventional free radical polymerization techniques). Suitable vinylaromatic monomers may include, but are not limited to styrene, α-methylstyrene, vinyltoluene, ethylvinylbenzene, vinylxylene, vinyl naphthalene and mixtures thereof. The sulfonated poly(vinylaromatic) groups may be present in the free acid form or in any of the water-soluble salt forms, such as, the sodium, potassium or ammonium salt forms. Preferably, the sulfonated poly(vinylaromatic) group is sulfonated polystyrene in the sodium form.

The mixed resin bed forms disclosed herein may be contained in any suitable containment structure. Suitable containment structures may include filter cartridges and other replaceable filter elements (e.g., disposable filter cartridges or elements used in filtering systems for consumer or commercial use).

The disclosed systems and methods are designed to reduce color throw which typically is observed after a filter comprising a strong acid cation resin has been stored for a period of time in which the filter is not in use. In particular, the disclosed methods and systems are designed to reduce color throw after storage, stagnation, or non-use times for filters that may include 24 hours, 48 hours, 72 hours, one week, one month, one year, or longer periods of time. The disclosed systems typically produce effluent water that is "clear" after the systems have been in non-use for a period of time, where "clear water" may be defined as water having less than about 10 ppm leachate (e.g., less than about 10 ppm styrene-sulfonate leachate).

In the disclosed filtering systems and methods, loss in volume-based operating capacity may be minimized. For example, the anion and cation resin beads may have a selected size and/or may be positioned in a manner such that the volumes of the component anion resin beads and the cation resin beads are not directly additive. In some embodiments, the volume of a mixture of anion resin and strong acid cation resin may be no more than about 30%, preferably no more than about 20%, and more preferably no more than 10% (by volume), greater than the sum of the volumes of the separate anion and cation resins. For example, the volume of a mixed resin bed prepared from 80 mls of cation resin combined with 20 mls of anion resin may be no more than 30%, preferably no more than about 20%, and more preferably no more than 10% greater than 100 mls (i.e., the sum of the separate volumes of anion resin and cation resin).

In some embodiments, the disclosed filtering systems and methods utilize mixed resin beds and do not exhibit significantly or substantially diminished filtering or softening capacity or efficiency in comparison to systems and methods that utilize a resin bed composed entirely of SAC resin (i.e., a non-mixed resin bed composed entirely of SAC resin). Typically, the filtering capacity or efficiency of the disclosed systems typically is at least about 70% of the filtering capacity or efficiency for a resin bed composed entirely of SAC resin (preferably at least about 75%, 80%, 85%, 90%, or 95% of the filtering capacity or efficiency for a resin bed composed entirely of SAC resin). In some embodiments, the filtering capacity or efficiency of the disclosed systems typically is at least about 70% of the filtering capacity or efficiency for a resin bed having a similar amount of SAC resin (preferably at least about 75%, 80%, 85%, 90%, or 95% of the filtering capacity or efficiency for a resin bed having a similar amount of SAC resin). Filtering or softening capacity may be assessed based on grain removal capacity or volume of effluent filtered prior to reaching a selected breakthrough value (e.g., no more than about 75% of influent hardness level or no more than about 100 mg/mL hardness level). Filtering or softening capacity or efficiency also may be assessed based on ion exchange kinetics or mass transfer coefficients (MTC) for the mixed bed in comparison to a non-mixed bed under an established set of conditions. In some embodiments, the ion exchange kinetics and/or the MTC per volume may not be significantly or substantially diminished for the mixed resin bed as compared to a non-mixed cation resin bed. In even further embodiments, a mixed bed resin may have an MTC per volume strong acid sulfonated cation exchange resin that is at least about 70% of an MTC per volume strong acid sulfonated cation exchange resin for a non-mixed resin bed (preferably at least about 75%, 80%, 85%, 90%, or 95% of a MTC per volume strong acid sulfonated cation exchange resin for a non-mixed resin bed).

In some embodiments, the disclosed filtering systems and methods utilize mixed resin beds and do not exhibit significantly or substantially diminished rate of flow or significantly or substantially increased back pressure in comparison to systems and methods that utilize a resin bed composed entirely of SAC resin. For example, in some embodiments the rate of flow for the mixed resin beds is at least about 70% of the rate of flow for a resin bed composed entirely of SAC resin under similar conditions (or at least about 75%, 80%, 85%, 90%, or 95% of the rate of flow for a resin bed composed entirely of SAC resin under similar conditions). In further embodiments, the back pressure for the mixed resin bed is not more than 20% higher than the back pressure for a resin bed composed entirely of SAC resin under similar conditions (or not more than 10% or 5% higher than the back pressure for a resin bed composed entirely of SAC resin under similar conditions).

The disclosed filtering systems and methods may utilize a mixed resin bed comprising anion resin beads that have a density that is less than, the same as, or greater than the density of the cation resin beads. For example, in some embodiments the anion resin beads and cation resin beads comprise divinyl benzene (DVB) cross-linked styrene beads (or beads comprising a styrene-DVB co-polymer). The densities of the anion resin beads and cation resin beads may vary based on the percentage of DVB utilized in the cross-linking reaction for preparing the DVB cross-linked styrene beads. For example, the DVB cross-linked styrene beads may be prepared from a reaction mixture comprising 2-20% DVB, where a higher percentage of DVB produces beads having a higher density. In some embodiments, the mixed resin beds disclosed herein may comprise anion resin having a DVB content of 2%, 4%, 6%, 8%, 10%, 12%, 14%, 16%, 18%, or 20% and cation resin having a DVB content of 2%, 4%, 6%, 8%, 10%, 12%, 14%, 16%, 18%, or 20%.

Illustrative Embodiments

Embodiment 1. A mixed bed ion exchange system comprising: (a) a strong acid sulfonated cation exchange resin; and (b) an anion exchange resin; wherein the anion exchange resin represents about 5-20% of total resin in the bed based on volume.

Embodiment 2. The system of embodiment 1, wherein the anion exchange resin has an average bead diameter that is no more than about 50%, 40%, 30%, or 20% of average bead diameter for the strong acid sulfonated cation exchange resin.

Embodiment 3. The system of embodiment 1 or 2, wherein the anion exchange resin represents about 10-20% or 15-20% of total resin in the bed based on volume.

Embodiment 4. The system of any of embodiments 1-3, wherein the strong acid sulfonated cation exchange resin is in salt form.

Embodiment 5. The system of any of embodiments 1-4, wherein the salt form is sodium salt.

Embodiment 6. The system of any of embodiments 1-5, wherein the anion exchange resin is a strong base anion resin.

Embodiment 7. The system of any of embodiments 1-6, wherein the anion exchange resin is in chloride form.

Embodiment 8. The system of any of embodiments 1-7, wherein the a strong acid sulfonated cation exchange resin has an average bead diameter of about 0.29 mm to about 1.20 mm.

Embodiment 9. The system of any of embodiments 1-8, wherein the anion exchange resin has an average bead diameter of about 0.06 mm to about 0.26 mm.

Embodiment 10. The system of any of embodiments 1-9, wherein the anion exchange resin has an average bead diameter of about 0.12 mm to about 0.48 mm.

Embodiment 11. The system of any of embodiments 1-10, wherein the a strong acid sulfonated cation exchange resin has an average bead diameter of about 0.7 mm to about 0.9 mm.

Embodiment 12. The system of any of embodiments 1-11, wherein the anion exchange resin has an average bead diameter of about 0.3 mm to about 0.5 mm.

Embodiment 13. The system of any of embodiments 1-12, wherein the anion exchange resin has a density that does not differ from density of the strong acid sulfonated cation exchange resin by more than about 20%.

Embodiment 14. The system of any of embodiments 1-13, wherein the anion exchange resin has a density that does not differ from density of the strong acid sulfonated cation exchange resin by more than about 10%.

Embodiment 15. The system of any of embodiments 1-14, wherein the anion exchange resin has a density that does not differ from density of the strong acid sulfonated cation exchange resin by more than about 5%.

Embodiment 16. The system of any of embodiments 1-15, wherein the strong acid sulfonated cation exchange resin and the anion resin form a tetrahedral structure in the mixed bed.

Embodiment 17. The system of any of embodiments 1-16, wherein the strong acid sulfonated cation exchange resin and the anion resin form a hexagonal structure in the mixed bed.

Embodiment 18. The system of any of embodiments 1-17, wherein the strong acid sulfonated cation exchange resin comprises divinylbenzene cross-linked styrene sulfonic acid.

Embodiment 19. The system of any of embodiments 1-18, wherein the volume of the mixed resin bed does not exceed the sum of the volume of the anion resin and the volume of the cation resin by more than about 20% (preferably does not exceed the sum of the volume of the anion resin and the volume of the cation resin by more than about 10%, even more preferably does not exceed the sum of the volume of the anion resin and the volume of the cation resin by more than about 5%).

Embodiment 20. The system of any of embodiments 1-19, wherein the mass transfer coefficient per volume cation resin for the mixed bed is at least about 75% of the mass transfer coefficient per volume cation resin for a non-mixed bed (preferably at least about 80%, 85%, 90%, or 95% of the mass transfer coefficient per volume cation resin for a non-mixed bed).

Embodiment 21. The system of any of embodiments 1-20, wherein each bead of the strong acid sulfonated cation resin is in direct contact with at least one bead of the anion resin in the mixed bed ion exchange system.

Embodiment 22. The system of any of embodiments 1-21, wherein the strong acid sulfonated cation exchange resin is in sodium form and the anion exchange resin is a strong base anion resin in chloride form.

Embodiment 23. The system of any of embodiments 1-22, wherein the a strong acid sulfonated cation exchange resin has an average bead diameter of about 0.29 mm to about 1.20 mm and the anion exchange resin has an average bead diameter of about 0.06 mm to about 0.26 mm.

Embodiment 24. The system of any of embodiments 1-23, wherein the a strong acid sulfonated cation exchange resin has an average bead diameter of about 0.29 mm to about 1.20 mm and the anion exchange resin has an average bead diameter of about 0.12 mm to about 0.48 mm.

Embodiment 25. The system of any of embodiments 1-24, wherein the a strong acid sulfonated cation exchange resin has an average bead diameter of about 0.7 mm to about 0.9 mm and the anion exchange resin has an average bead diameter of about 0.3 mm to about 0.5 mm.

Embodiment 26. The system of any of embodiments 1-25, wherein the strong acid sulfonated cation exchange resin and the anion resin form a structure in the mixed bed ion exchange system which is tetrahedral or hexagonal.

Embodiment 27. A filter cartridge comprising the system of any of embodiments 1-26, where, optionally, the cartridge is disposable.

Embodiment 28. A method of filtering water comprising: (a) storing or maintaining the filter cartridge of embodiment 27 in a period of non-use which is greater than about 24 hours (or greater than about 48 hours, 72 hours, 1 month, or 1 year); (b) passing an initial sample of influent water through the filter cartridge (e.g., an initial sample having a volume of about 100 mls, 250 mls, 500 mls, or 1000 mls) to obtain an initial sample of filtered effluent water, where the initial sample of filtered effluent water has a hardness of less than about 70% of the hardness for the initial sample of influent water (e.g., where the initial sample of filtered effluent water has a hardness of less than about 100 mg/mL divalent cation salt such as calcium carbonate); where the initial sample of filtered effluent water is clear (e.g., where the initial sample of filtered effluent water has less than about 10 ppm styrene sulfonate leachate); and where preferably the initial sample of filtered effluent water does not have a foul odor (e.g., a sulfurous odor, an ammonia odor, or a fishy odor).

Embodiment 29. The method of embodiment 28, further comprising passing a subsequent sample of influent water through the filter cartridge (e.g., a sample having a volume of at least about 200 gallons, 250 gallons, or 300 gallons) to obtain a subsequent sample of filtered effluent water, where the subsequent sample of filtered effluent water has a hardness of less than about 70% of the hardness for the subsequent sample of influent water.

Embodiment 30. A method for reducing color throw in a strong acid sulfonated cation resin exchange system, the method comprising: (a) combining the strong acid sulfonated cation resin and an anion exchange resin to prepare a mixed resin bed ion exchange system, wherein the anion exchange resin represents about 5-20% of total resin in the mixed resin bed ion exchange system based on volume; (b) filtering water through the mixed resin bed ion exchange system, wherein the mixed resin bed ion exchange system exhibits reduced color throw in comparison to the strong acid sulfonated cation resin exchange system.

Embodiment 31. The method of embodiment 30, wherein the anion exchange resin has an average bead diameter that is no more than about 50% of average bead diameter for the strong acid sulfonated cation exchange resin.

Embodiment 32. The method of any of embodiments 30 or 31, wherein the anion exchange resin represents about 10-20% or 15-20% of total resin in the mixed resin bed ion exchange system based on volume.

Embodiment 33. The method of any of embodiments 30-32, wherein the anion exchange resin has an average bead diameter that is no more than about 50%, 40%, 30% or 20% of average bead diameter for the strong acid sulfonated cation exchange resin.

Embodiment 34. The method of any of embodiments 29-33, wherein each bead of the strong acid sulfonated cation resin is in direct contact with at least one bead of the anion resin in the mixed resin bed ion exchange system.

Embodiment 35. The method of any of embodiments 29-34, wherein the strong acid sulfonated cation exchange resin is in sodium form and the anion exchange resin is a strong base anion resin in chloride form.

Embodiment 36. The method of any of embodiments 29-35, wherein the a strong acid sulfonated cation exchange resin has an average bead diameter of about 0.29 mm to about 1.20 mm and the anion exchange resin has an average bead diameter of about 0.06 mm to about 0.26 mm.

Embodiment 37. The method of any of embodiments 29-36, wherein the a strong acid sulfonated cation exchange resin has an average bead diameter of about 0.29 mm to about 1.20 mm and the anion exchange resin has an average bead diameter of about 0.12 mm to about 0.48 mm.

Embodiment 38. The method of any of embodiments 29-37, wherein the a strong acid sulfonated cation exchange resin has an average bead diameter of about 0.7 mm to about 0.9 mm and the anion exchange resin has an average bead diameter of about 0.3 mm to about 0.5 mm.

Embodiment 39. The method of any of embodiments 29-38, wherein the anion exchange resin has a density that does not differ from density of the strong acid sulfonated cation exchange resin by more than about 10%.

Embodiment 40. The method of any of embodiments 29-39, wherein the strong acid sulfonated cation exchange resin and the anion resin form a structure in the mixed bed ion exchange system which is tetrahedral or hexagonal.

Embodiment 41. The method of any of embodiments 29-40, wherein the mixed resin bed ion exchange system exhibits reduced color throw in comparison to the strong acid sulfonated cation resin exchange system after having been stored for at least about 24 hours without use (or 48 hours without use or 72 hours without use).

Embodiment 42. The method of any of embodiments 29-41, wherein the volume of the mixed resin bed ion exchange system does not exceed the sum of the volume of the anion resin and the volume of the cation resin by more than about 20% (preferably does not exceed the sum of the volume of the anion resin and the volume of the cation resin by more than about 10%, even more preferably does not exceed the sum of the volume of the anion resin and the volume of the cation resin by more than about 5%).

Embodiment 43. The method of any of embodiments 29-42, wherein the mass transfer coefficient per volume cation resin for the mixed bed ion exchange system is at least about 75% of the mass transfer coefficient per volume cation resin for a non-mixed bed ion exchange system (preferably at least about 80%, 85%, 90%, or 95% of the mass transfer coefficient per volume cation resin for a non-mixed bed ion exchange system).

Embodiment 44. The method of any of embodiments 29-43, wherein the mixed resin bed ion exchange system has a filtration capacity per volume cation resin that is at least about 70% of the filtration capacity per cation resin for the strong acid sulfonated cation resin exchange system (preferably as measured by grain removal capacity or volume of effluent prior to breakthrough (e.g., at a breakthrough level of no more than about 75% of influent hardness level or no more than about 100 mg/L)), and wherein filtration capacity may be defined as hardness reduction capacity and/or softening capacity.

EXAMPLES

The following examples are illustrative and are not intended to limit the invention.

Example 1

Comparative Test of Color Throw from Mixed Resin

A filter cartridge comprising a mixed resin bed of 80% strong acid sulfonated cation resin (sodium form, gel) and 20% strong base anion resin (chloride form, gel) was prepared. For comparison, a filter cartridge comprising 100% strong acid sulfonated cation resin (sodium form, gel) was compared.

Testing was conducted in duplicate by flushing the cartridges with tap water at 0.50 gpm and collecting the initial liter of water in consecutive 250 mL intervals. After the collection, flushing was continued at a 0.50 gpm flow rate for 5 minutes. After 24 hours, the cartridges were flushed and sampled again then held for 48 hours for a final flush and sample. The samples were photographed and analyzed for total dissolved solids (TDS) present, and pH of the initial 250 mL sample. Results are provided in Table 1.

TABLE 1

| Sample | Initial pH | $1^{st}$ 250 mL (Color/TDS) | $2^{nd}$ 250 mL (Color/TDS) | $3^{rd}$ 250 mL (Color/TDS) | $4^{th}$ 250 mL Color/TDS |
|---|---|---|---|---|---|
| Hold Time - 0 hours | | | | | |
| Blank | 7.32 | Clear/217 | — | — | — |
| Control 1 | 7.00 | Medium Yellow/1180 | Light Yellow/295 | Light yellow/230 | Clear/218 |
| Control 2 | 7.02 | Medium Yellow/1110 | Light Yellow/284 | Light yellow/228 | Clear/221 |
| Test 1 | 6.14 | Slight Milky*/1270 | Clear/375 | Clear/305 | Clear/289 |
| Test 2 | 6.16 | Slight Milky*/1290 | Clear/371 | Clear/298 | Clear/282 |
| Hold Time - 24 hours | | | | | |
| Blank | 7.39 | Clear/214 | — | — | — |
| Control 1 | 7.39 | Light Yellow/279 | Light Yellow/256 | Light Yellow/251 | Clear/223 |
| Control 2 | 7.52 | Light Yellow/257 | Light Yellow/257 | Light Yellow/243 | Clear/218 |
| Test 1 | 7.52 | Clear/359 | Clear/366 | Clear/333 | Clear/271 |
| Test 2 | 7.53 | Clear/361 | Clear/370 | Clear/334 | Clear/266 |
| Hold Time - 48 hours | | | | | |
| Blank | 7.38 | Clear/214 | — | — | — |
| Control 1 | 7.64 | Light Yellow/245 | Light Yellow/256 | Light Yellow/224 | Clear/213 |
| Control 2 | 7.49 | Light Yellow/245 | Light Yellow/247 | Light Yellow/231 | Clear/214 |
| Test 1 | 7.49 | Clear/357 | Clear/330 | Clear/313 | Clear/259 |
| Test 2 | 7.33 | Clear/330 | Clear/328 | Clear/291 | Clear/258 |

Blank - Tap Water
Control - 100% strong acid sulfonated cation resin
Test - 80% strong acid sulfonated cation resin/20% strong base anion resin
"Clear" - estimated to be less than about 10 ppm leachate
*The initial "Slightly Milky" color of the test cartridge effluent may be attributed to dissolved air.

The initial flushing of the control cartridges revealed that the control cartridges flowed yellow during the first ¾ liter of water. After a 24-hour hold and a 48-hour hold, the control cartridges flushed yellow for the first ¾ liter. The initial flushing of the test cartridges revealed that the first ¼ liter of water was milky in color. None of the other samples from the test cartridges had any noticeable color. No noticeable odors were detected in any of the samples.

The total dissolved solids (TDS) of the initial effluent from all the cartridges was above 1000 mg/L and then dropped to ranges between 213-375 mg/L. Subsequent effluent from the test cartridges had a TDS of about 259-375 mg/L, and subsequent effluent from the control cartridges had a TDS of about 213-295 mg/L.

The results indicate that the test cartridges did not leach color after the initial 250 ml flushing. The control cartridges produced yellow/brown effluent after remaining without use for as little as 24 hours. No odors were detected in any of the samples.

Example 2

Assessment of Color Throw from Mixed Resin

A resin bed was prepared by combining 80 mls of strong acid sulfonated cation resin (sodium form, gel) and 20% strong base anion resin (chloride form, gel). The color throw of the resin after three successive 24-hour stagnation periods was tested as follows.

Equipment for the testing including: a 250-mL glass column, ~1" i.d. with teflon stopcock; glass wool or filter pads; a funnel; dechlorinated tap water (DTW), 20° C. +/−2° C.; a 250-mL beaker or Erlenmeyer flask; a squirt bottle; a UV-Visible Spectrophotometer (HACH 2010 or equivalent); and white paper towels. The plug of glass wool or filter pad was placed at the bottom of the glass column to hold the resin. Approximately 50 mL of DTW was placed in the glass column. Approximately 100 mL of the mixed resin was measured in the beaker or flask (+/−5 mL) and covered with DTW. The mixed resin was allowed to settle to determine the final volume. The funnel was placed on top of the glass column and the resin was transferred to the column using a squirt bottle with DTW to rinse the resin. The column stopcock was opened to full position and the column was flushed with 300 mL of DTW. The stopcock then was closed and approximately 100 mL of DTW was added to cover the top of the resin bed. The resin bed was allowed to set for a period of stagnation (e.g., 24 hours, 48 hours, and 72 hours). After the stagnation period, the contents of the column were drained into a 100-mL beaker and place on a white background (paper towel). The visual color was recorded according to the following scale: I—clear (using DTW as a blank)(which is estimated to be less than about 10 ppm leachate); II—very slightly yellow (just barely visible)(which is estimated to be about 10-20 ppm leachate); III—slightly yellow (very light but definitely visible); IV—yellow; V—very yellow; VI—yellow-brown (light tea color); VII—brownish-yellow (definite tea color); VIII—brown to dark brown. For observed colors from II to VIII, the $\lambda_{max}$ (absorption maxima) may be determined by measuring the absorbance VS wavelength through a spectral range in 10 nm increments. No visible color was observed in the resin leachate for all stagnation periods. Due to the lack of color, the $\lambda_{max}$ was not determined for samples from any stagnation period. The mixed resins were stored for further testing after one-year.

Example 3

Total Organic Carbon (TOC) Release Test for Mixed Resin

Figure 1:
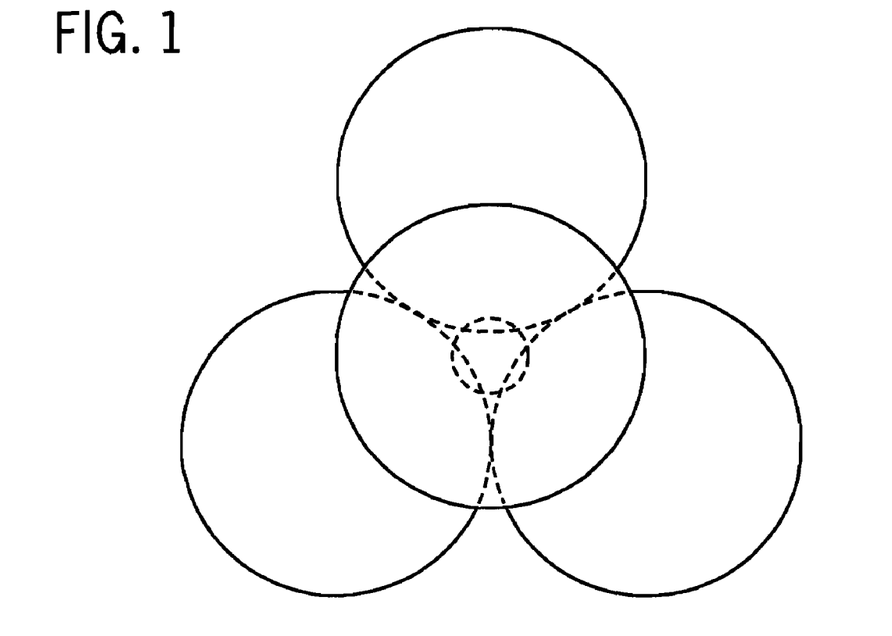
FIG. 1 shows a diagram of a tetrahedral structure comprising cation resin beads (large) and an anion resin bead (small).
Figure 2:
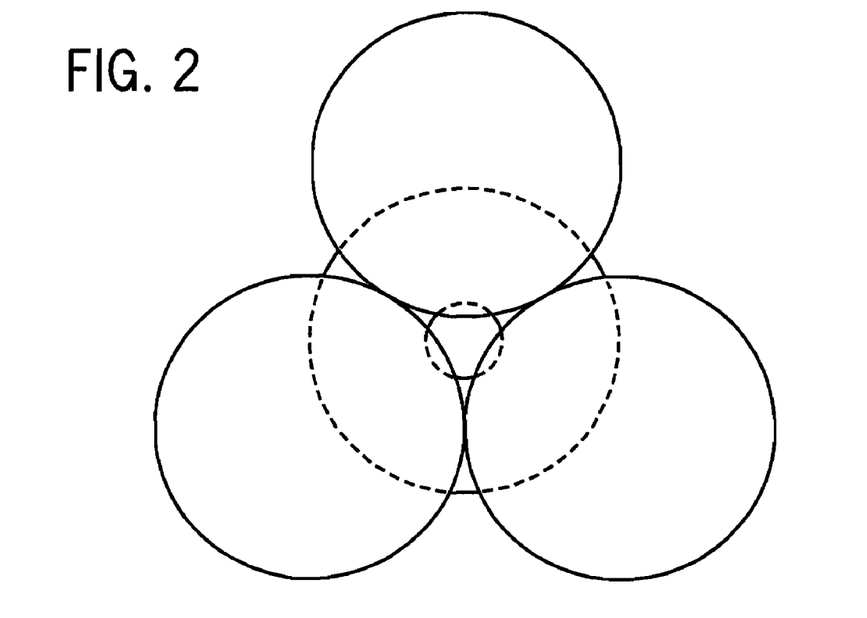
FIG. 2 shows a space-filling tetrahedral structure comprising cation resin beads (large) and an anion resin bead (small).
Figure 3:
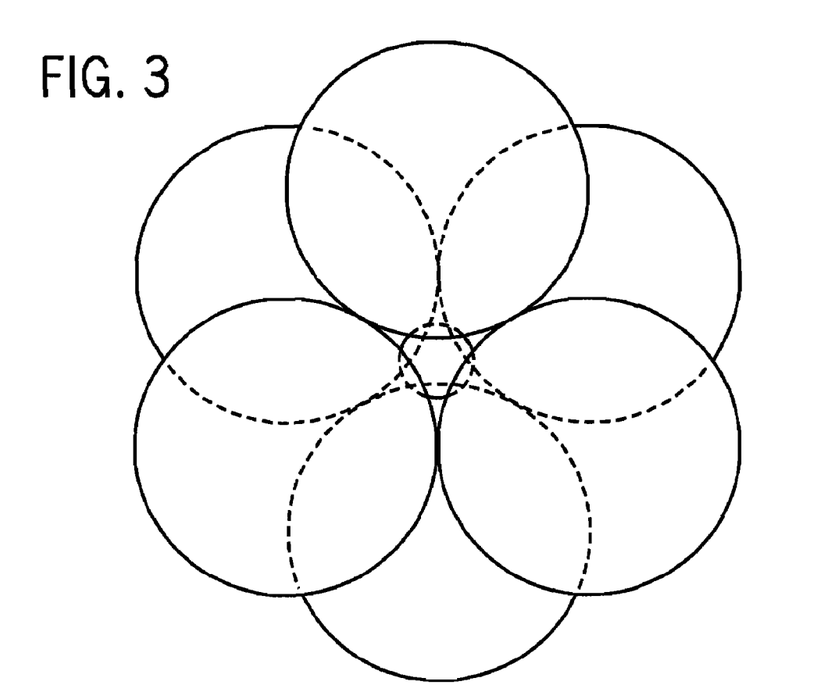
FIG. 3 shows the side view of a hexagonal structure comprising cation resin beads (large) and an anion resin bead (small).
Figure 4:
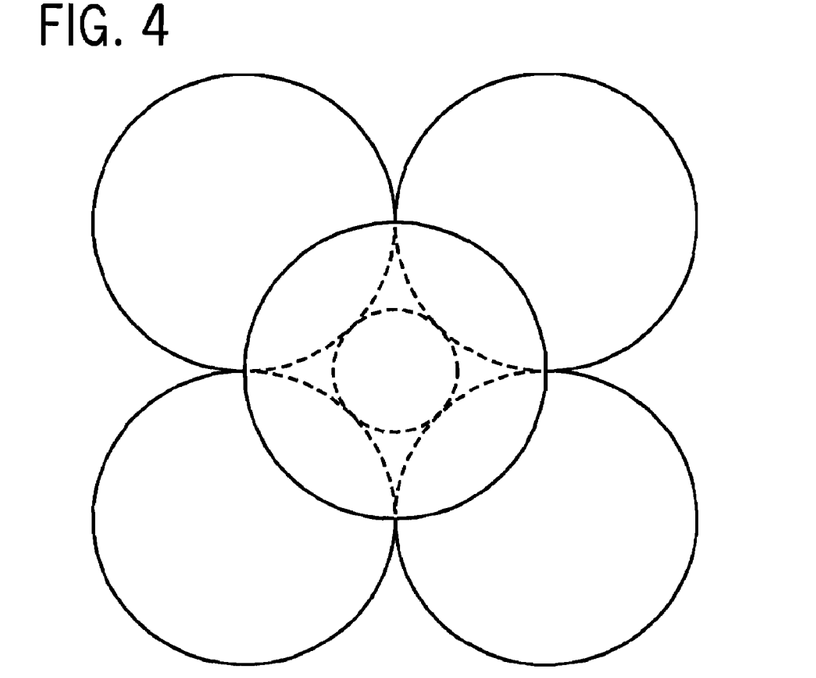
FIG. 4 shows the top view of a hexagonal structure comprising cation resin beads (large) and an anion resin bead (small).
Figure 5:
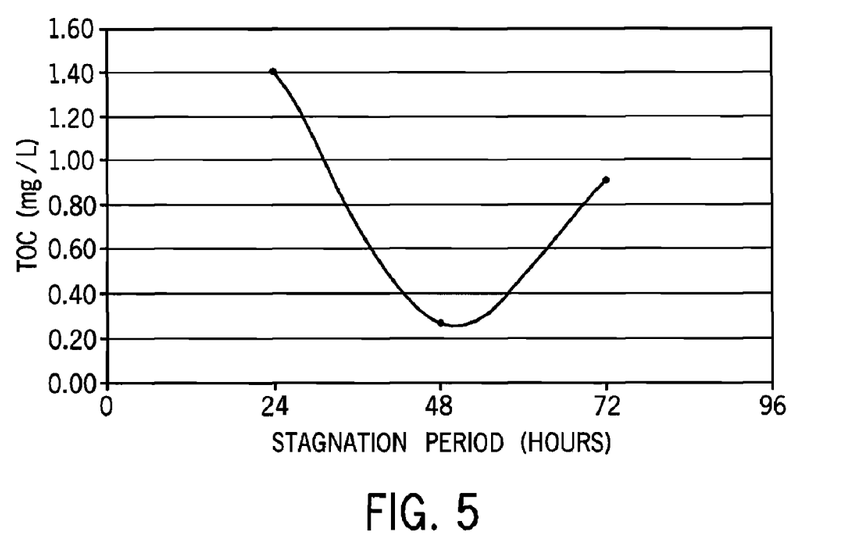
FIG. 5 is a graph of total organic carbon (TOC) versus stagnation period for a mixed resin of 80% strong acid sulfonated cation resin (sodium form, gel) and 20% strong base anion resin (chloride form, gel).
Figure 6:
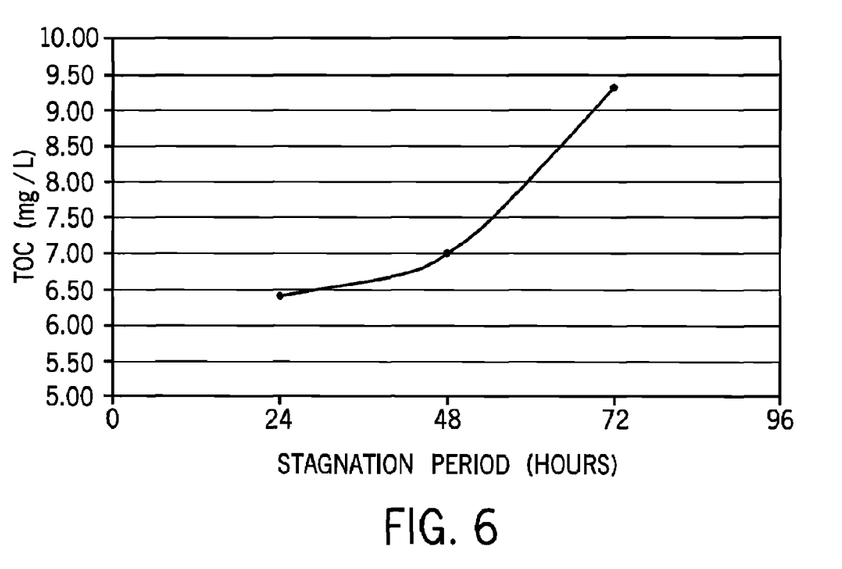
FIG. 6 is a graph of total organic carbon (TOC) versus stagnation period for a non-mixed resin, 100% strong acid sulfonated cation resin (sodium form, gel).

Total Organic Carbon released from a mixed resin (80% strong acid sulfonated cation resin/20% strong base anion) was compared to a non-mixed resin (100% strong acid sulfonated cation resin) using the procedure described in Example 2. Preparation for the TOC test was conducted in a 250 mL glass column using de-chlorinated tap water (DTW). The resin column was flushed with 300 mL of DTW and 100 mL was used to cover the resin during 24, 48 and 72 hour stagnation periods. A 250 mL beaker filled with 100 mL of DTW was used as the blank. After each stagnation period, 100 mL of resin leachate was collected and 10 mL of the sample was poured into a clean TOC sample vial for TOC analysis. Each TOC sample was preserved with 1:1 HCl using PureLab water. TOC analysis was conducted on a Shimadzu 5000A TOC analyzer. Results are presented in FIGS. 5 & 6. The effluent from the mixed resin had TOC levels of less than about 1.4 mg/L after a 24-hour stagnation period; less than about 0.4 mg/L after a 48-hour stagnation period; and less than about 1.0 mg/L after a 72-hour stagnation period. The effluent from the non-mixed resin had TOC levels of greater than about 6.0 mg/L after a 24-hour stagnation period; greater than about 7.0 mg/L after a 48-hour stagnation period; and greater than about 9.0 mg/L after a 72-hour stagnation period.

Example 4

Comparative Softening Capacity for Mixed Resin

The softening capacity (or hardness reduction capacity) for the resins of Example 1 were compared. Testing was performed in duplicate for a test cartridge (mixed resin) and a control cartridge (non-mixed resin). Testing was performed with a flow rate of 0.50 gpm and 60 psi inlet pressure. Tap water was used for testing under a "10 minute on/10 minute off" cycle regimen.

Figure 7:
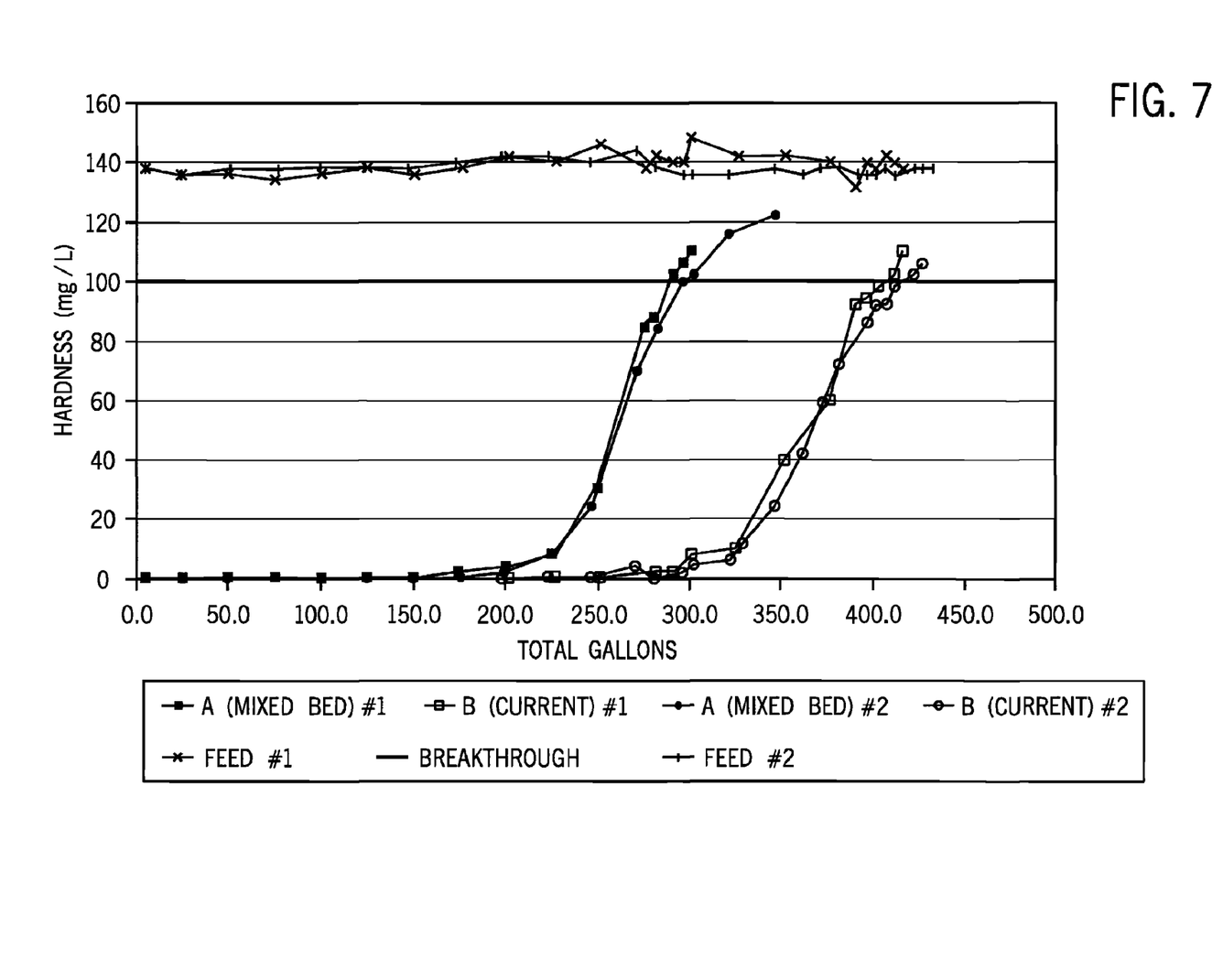
FIG. 7 is a graph of the water hardness reduction comparison of a mixed resin (80% strong acid sulfonated cation resin (sodium form, gel) and a 20% strong base anion resin (chloride form, gel)) versus a non-mixed strong acid sulfonated cation resin (sodium form, gel). Influent water (feed) had a hardness of about 140 mg/L and breakthrough was set at about 100 mg/L.

Samples of effluent and influent (50 mL) water were titrated with 0.010 M EDTA to determine the water hardness in mg/L (i.e., based on divalent cation concentration). A color indicator was used to indicate the endpoint for the titration. Influent tap water hardness was ~140 mg/L. Hardness concentration (mg/L) was assessed in the middle of the "on" cycle (i.e., at 300 sec), at the end of the first full cycle; and every 5 full cycles thereafter (or 25 gallons) until breakthrough. Testing was ceased when the effluent had a hardness concentration of >100 mg/L. Results are presented in FIG. 7. For the duplicate test cartridges, breakthrough hardness levels of greater than about 100 mg/L in the effluent were observed after 291 gallons for the first test cartridge and after 302 gallons for the second test cartridge. For the duplicate control cartridges, breakthrough hardness levels of greater than about 100 mg/L in the effluent were observed after 411 gallons for the first control cartridge and after 421 gallons for the second control cartridge. Based on this observation, filtration capacity for the test cartridges was estimated to be at least about 70% of the filtration capacity for the control cartridges.

The grain capacity removal (GCR) was calculated as: GCR=total gallons treated×8 grains/gallon. For the duplicate test cartridges, the GCR was 2328 grains for the first cartridge and 2416 grains for the second cartridge. For the duplicate control cartridges, the GCR was 3288 grains for the first cartridge and 3368 grains for the second cartridge. Based on this observation, filtration capacity for the test cartridges was estimated to be at least about 70% of the filtration capacity for the control cartridges.

What is claimed is:

1. A mixed bed ion exchange system comprising:
   (a) a strong acid sulfonated cation exchange resin; and
   (b) a strong base anion exchange resin;
   wherein the anion exchange resin represents about 5-20% of total resin in the mixed bed ion exchange system based on volume and the anion exchange resin has an average bead diameter that is no more than about 50% of average bead diameter for the strong acid sulfonated cation exchange resin.

2. The system of claim 1, wherein the anion exchange resin represents about 15-20% of total resin in the mixed bed ion exchange system based on volume.

3. The system of claim 1, wherein the anion exchange resin has an average bead diameter that is no more than about 30% of average bead diameter for the strong acid sulfonated cation exchange resin.

4. The system of claim 1, wherein each bead of the strong acid sulfonated cation resin is in direct contact with at least one bead of the anion resin in the mixed bed ion exchange system.

5. The system of claim 1, wherein the strong acid sulfonated cation exchange resin is in sodium form and the strong base anion resin is in chloride form.

6. The system of claim 1, wherein the a strong acid sulfonated cation exchange resin has an average bead diameter of about 0.29 mm to about 1.20 mm and the anion exchange resin has an average bead diameter of about 0.06 mm to about 0.26 mm.

7. The system of claim 1, wherein the a strong acid sulfonated cation exchange resin has an average bead diameter of about 0.29 mm to about 1.20 mm and the anion exchange resin has an average bead diameter of about 0.12 mm to about 0.48 mm.

8. The system of claim 1, wherein the a strong acid sulfonated cation exchange resin has an average bead diameter of about 0.7 mm to about 0.9 mm and the anion exchange resin has an average bead diameter of about 0.3 mm to about 0.5 mm.

9. The system of claim 1, wherein the anion exchange resin has a density that does not differ from density of the strong acid sulfonated cation exchange resin by more than about 10%.

10. The system of claim 1, wherein the strong acid sulfonated cation exchange resin and the anion resin form a structure in the mixed bed ion exchange system which is tetrahedral or hexagonal.

11. A disposable filter cartridge comprising the system of claim 1.

12. A method of filtering water comprising:
(a) storing or maintaining the filter cartridge of claim 11 in a period of non-use that exceeds about 24 hours;
(b) passing an initial sample of influent water having a volume of no more than about 250 mls through the filter cartridge to obtain an initial sample of filtered effluent water, wherein the initial sample of filtered effluent water has a hardness of less than about 70% of the hardness for the initial sample of influent water and the initial sample of filtered effluent water is clear.

13. A method for reducing color throw in a strong acid sulfonated cation resin exchange system, the method comprising:
filtering water through the mixed resin bed ion exchange system of claim 1, wherein the mixed resin bed ion exchange system exhibits reduced color throw in comparison to a system comprising a similar amount of strong acid sulfonated cation resin.

14. The method of claim 13, wherein the mixed resin bed ion exchange system has a filtration capacity that is at least about 70% of filtration capacity for the strong acid sulfonated cation resin exchange the system comprising a similar amount of strong acid sulfonated cation resin.

15. The method of claim 13, wherein the anion exchange resin has an average bead diameter that is no more than about 50% of average bead diameter for the strong acid sulfonated cation exchange resin.

16. The method of claim 13, wherein the anion exchange resin represents about 15-20% of total resin in the mixed resin bed ion exchange system based on volume.

17. The method of claim 13, wherein the anion exchange resin has an average bead diameter that is no more than about 30% of average bead diameter for the strong acid sulfonated cation exchange resin.

18. The method of claim 13, wherein each bead of the strong acid sulfonated cation resin is in direct contact with at least one bead of the anion resin in the mixed resin bed ion exchange system.

19. The method of claim 13, wherein the strong acid sulfonated cation exchange resin is in sodium form and the anion exchange resin is a strong base anion resin in chloride form.

20. The method of claim 13, wherein the a strong acid sulfonated cation exchange resin has an average bead diameter of about 0.29 mm to about 1.20 mm and the anion exchange resin has an average bead diameter of about 0.06 mm to about 0.26 mm.

21. The method of claim 13, wherein the a strong acid sulfonated cation exchange resin has an average bead diameter of about 0.29 mm to about 1.20 mm and the anion exchange resin has an average bead diameter of about 0.12 mm to about 0.48 mm.

22. The method of claim 13, wherein the a strong acid sulfonated cation exchange resin has an average bead diameter of about 0.7 mm to about 0.9 mm and the anion exchange resin has an average bead diameter of about 0.3 mm to about 0.5 mm.

23. The method of claim 13, wherein the anion exchange resin has a density that does not differ from density of the strong acid sulfonated cation exchange resin by more than about 10%.

24. The method of claim 13, wherein the strong acid sulfonated cation exchange resin and the anion resin form a structure in the mixed bed ion exchange system which is tetrahedral or hexagonal.

25. The method of claim 13, wherein the mixed resin bed ion exchange system exhibits reduced color throw in comparison to the strong acid sulfonated cation resin exchange system after 72 hours without use.

* * * * *